US011335198B2

(12) United States Patent
Yanagida et al.

(10) Patent No.: US 11,335,198 B2
(45) Date of Patent: *May 17, 2022

(54) NOTIFICATION SYSTEM, NOTIFICATION DEVICE, AND NOTIFICATION METHOD

(71) Applicant: TOYOTA JIDOSHA KABUSHIKI KAISHA, Toyota (JP)

(72) Inventors: Tohru Yanagida, Nagoya (JP); Chikage Kubo, Chofu (JP); Ai Fujimura, Toyota (JP); Shunsuke Noda, Kakamigahara (JP); Satoshi Usui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

This patent is subject to a terminal disclaimer.

(21) Appl. No.: 16/849,597

(22) Filed: Apr. 15, 2020

(65) Prior Publication Data

US 2020/0242931 A1 Jul. 30, 2020

Related U.S. Application Data

(63) Continuation of application No. 16/190,326, filed on Nov. 14, 2018, now Pat. No. 10,657,812.

(30) Foreign Application Priority Data

Nov. 28, 2017 (JP) ............................ JP2017-228093

(51) Int. Cl.
*G01C 21/26* (2006.01)
*G08G 1/123* (2006.01)
*G08G 1/00* (2006.01)
*G08G 1/005* (2006.01)

(52) U.S. Cl.
CPC ............ *G08G 1/123* (2013.01); *G08G 1/005* (2013.01); *G08G 1/205* (2013.01)

(58) Field of Classification Search
None
See application file for complete search history.

(56) References Cited

U.S. PATENT DOCUMENTS

| | | | | |
|---|---|---|---|---|
| 6,650,999 | B1 | 11/2003 | Brust | |
| 9,194,710 | B1 * | 11/2015 | Iyer | G01C 21/3697 |
| 9,344,831 | B2 * | 5/2016 | Tanaka | B60R 25/24 |
| 2009/0091477 | A1 * | 4/2009 | Mc Call | G01S 19/42 340/990 |
| 2014/0315526 | A1 | 10/2014 | Tanaka | |
| 2016/0078688 | A1 | 3/2016 | Behr | |
| 2016/0203650 | A1 | 7/2016 | Stanford | |
| 2017/0160089 | A1 | 6/2017 | Jang | |

(Continued)

FOREIGN PATENT DOCUMENTS

| | | | |
|---|---|---|---|
| CN | 105390018 | A | 3/2016 |
| CN | 107132546 | A | 9/2017 |

(Continued)

*Primary Examiner* — Brent Swarthout
(74) *Attorney, Agent, or Firm* — Oblon, McClelland, Maier & Neustadt, L.L.P.

(57) ABSTRACT

A notification system includes a notification unit configured to notify a second person of position information relating to a parking position of a vehicle and auxiliary information to help the second person to find the vehicle after the vehicle is moved and parked by a first person.

16 Claims, 7 Drawing Sheets

(56) References Cited

U.S. PATENT DOCUMENTS

| | | | | |
|---|---|---|---|---|
| 2018/0095456 | A1 | 4/2018 | Obaidi | |
| 2018/0225650 | A1* | 8/2018 | Vossoughi | G08G 1/148 |
| 2019/0188817 | A1 | 6/2019 | Yanagida | |

FOREIGN PATENT DOCUMENTS

| | | | |
|---|---|---|---|
| JP | 2002-24367 | A | 1/2002 |
| JP | 2009-110045 | A | 5/2009 |
| JP | 2015-153217 | | 8/2015 |
| JP | 2017-27546 | | 2/2017 |

* cited by examiner

NOTIFICATION SYSTEM, NOTIFICATION DEVICE, AND NOTIFICATION METHOD

CROSS-REFERENCE TO RELATED APPLICATIONS

This application is a continuation of U.S. patent application Ser. No. 16/190,326, now U.S. Pat. No. 10,657,812, filed Nov. 14, 2018, which is based upon and claims the benefit of priority to Japanese Patent Application No. 2017-228093 filed Nov. 28, 2017, the entire contents of each of which are incorporated herein by reference in their entirety.

BACKGROUND

1. Technical Field

The disclosure relates to a notification system, a notification device, and a notification method capable of easily finding a target vehicle.

2. Description of Related Art

Not only an owner of a vehicle but also various persons (family member or another person) may get in the vehicle. There are a wide variety of vehicles. Therefore, an appearance (vehicle type, color, plate number, or the like) of a target vehicle searched for by a certain person may not be grasped by the person. When the appearance of the target vehicle searched for by the person is not grasped, it is difficult for the person to find the vehicle. Even though the appearance of the target vehicle searched for by the person is grasped, the vehicle may not be easily found. For example, in a case where a plurality of persons may use the same vehicle, when a person H1 parks a vehicle C and then another person H2 intends to use the vehicle C, the person H2 may not be able to find the vehicle C since the person H2 does not grasp a position of the vehicle C parked by the person H1.

In Japanese Unexamined Patent Application Publication No. 2017-027546 (JP 2017-027546 A), a parking position guidance system configured to guide a user to a parking position of the target vehicle is disclosed. In the parking position guidance system disclosed in JP 2017-027546 A, an on-vehicle device sends the parking position of the vehicle based on global positioning system (GPS) data to a management server. A portable terminal acquires the parking position of the vehicle from the management server and guides the user to the acquired parking position of the vehicle.

SUMMARY

However, since the GPS data is insufficient in terms of accuracy, it is not possible to notify the user of the parking position of the target vehicle with high accuracy in the parking position guidance system disclosed in JP 2017-027546 A.

The disclosure provides a notification system, a notification device, and a notification method capable of finding a target vehicle more easily.

The disclosure employs a method of notifying a user of another piece of information (auxiliary information) to help the user to find the vehicle in addition to position information relating to a parking position of the vehicle.

A first aspect of the invention relates to a notification system including a notification unit. The notification unit is configured to notify a second person of position information relating to a parking position of a vehicle and auxiliary information to help the second person to find the vehicle after the vehicle is moved and parked by a first person.

According to the first aspect of the disclosure, since the auxiliary information is also notified in addition to the position information, it is possible for the second person to easily find the vehicle as compared with when a target vehicle is searched from solely the position information.

The position information may include information obtained by a satellite positioning system. Therefore, it is possible for the second person to easily approach the target vehicle to some extent by checking the position information.

In the notification system according to the first aspect, the auxiliary information may include at least any of a voice relating to the parking position of the vehicle, a photograph relating to the parking position of the vehicle, or a text relating to the parking position of the vehicle. Therefore, it is possible for the second person to easily find the target vehicle by checking a voice, a photograph, a text, or the like after the second person approaches the target vehicle to some extent or the like.

In the notification system according to the first aspect, the auxiliary information may include predetermined information relating to an output unit configured to output a predetermined signal to a predetermined area around the parking position of the vehicle. The notification unit may notify the second person of information based on the predetermined signal when the second person enters the predetermined area. Therefore, it is possible for the second person to easily grasp that the second person approaches the target vehicle by checking the information based on the predetermined signal and thus to easily find the vehicle.

In the notification system according to the first aspect, the information based on the predetermined signal may be information relating to a distance between the second person and the output unit. Therefore, it is possible for the second person to easily grasp that the second person continues to approach the target vehicle by checking the information based on the predetermined signal and thus to easily find the vehicle.

In the notification system according to the first aspect, the output unit may be a beacon, and the predetermined information may be a beacon ID. The notification system according to the first aspect may further include a first terminal used by the first person, a second terminal that is used by the second person and functions as the notification unit, and a server that is communicable with the first terminal and the second terminal. The first terminal may send the position information and the auxiliary information to the second terminal through the server after the vehicle is parked by the first person.

In the notification system according to the first aspect, the notification unit may perform guidance to the parking position of the vehicle based on the position information. Therefore, it is possible for the second person to easily approach the target vehicle to some extent by simply moving according to the guidance.

The notification system according to the first aspect may further include a demand unit configured to demand parking of the vehicle of the first person based on a request from the second person. Therefore, it is possible for the first person to move and park the target vehicle solely when there is the request from the second person.

The notification system according to the first aspect may further include a first acquisition unit configured to acquire the position information after the vehicle is parked by the first person and a second acquisition unit configured to acquire the auxiliary information after the vehicle is parked by the first person. Therefore, it is possible to suppress the notification of erroneous information before the parking to the second person and to notify the second person of accurate information after the parking.

The notification system according to the first aspect may further include a first terminal used by the first person, a second terminal that is used by the second person and functions as the notification unit, and a server that is communicable with the first terminal and the second terminal. The first terminal may send the position information and the auxiliary information to the second terminal through the server after the vehicle is parked by the first person.

A second aspect of the disclosure relates to a notification device including a notification unit. The notification unit is configured to notify a second person of position information relating to a parking position of a vehicle and auxiliary information to help the second person to find the vehicle after the vehicle is moved and parked by a first person.

A third aspect of the disclosure relates to a notification method including notifying a second person of position information relating to a parking position of a vehicle and auxiliary information to help the second person to find the vehicle after the vehicle is moved and parked by a first person.

It is possible to regard the disclosure as the notification system, the notification device, and the like having at least some of the configurations or the functions. It is possible to regard the disclosure as the notification method, the control method of the notification system, the control method of the notification device, and the like including at least some of the processes. It is possible to regard the disclosure as a program causing a computer to execute the method, a computer readable recording medium storing the program as described above in a non-transitory manner, and the like. It is possible to combine each of the configurations and the processes to configure the disclosure as long as there is no technical inconsistency.

According to the aspects of the disclosure, it is possible to find the target vehicle more easily.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The disclosure relates to a technique capable of easily finding a target vehicle. A smart key system is known as a technique relating to a vehicle. The smart key system is a system capable of locking and unlocking doors or starting an engine when a unique ID is assigned to a portable apparatus (smart key) that performs wireless communication with the vehicle and the ID obtained by the communication matches an ID registered in advance for the vehicle. As a system based on the smart key system, there is a system that portable terminals such as a mobile phone, a smartphone, a tablet terminal, and a notebook type personal computer can be used instead of the portable apparatus. The disclosure can be preferably used, for example, in the system that the portable terminal can be used instead of the portable apparatus.

When the system that the portable terminal can be used instead of the portable apparatus is used, it is possible to provide various services not experienced before. For example, it is possible to provide a valet parking service that a substitute agent moves and parks the vehicle instead of a requester who requests a valet parking. In the valet parking service of the vehicle, a parking position of the vehicle is decided by the substitute agent. The parking position of the vehicle can be set in advance. However, when another vehicle is already parked at the parking position of the vehicle set in advance, the substitute agent parks the vehicle at another position. As described above, the parking position of the vehicle depends on the substitute agent or a parking situation. Therefore, when the vehicle is picked up, the requester may not easily grasp the parking position of the vehicle and may not easily find the vehicle. When a parking lot including the parking position of the vehicle set in advance is full, the substitute agent parks the vehicle at a position far away from the parking position of the vehicle set in advance (another parking lot) and it is extremely difficult to find the vehicle by the requester. Consequently, the disclosure can be preferably used in the valet parking service of the vehicle.

Embodiment 1

Hereinafter, an embodiment 1 of the disclosure will be described with reference to drawings.

System Configuration

Figure 1:
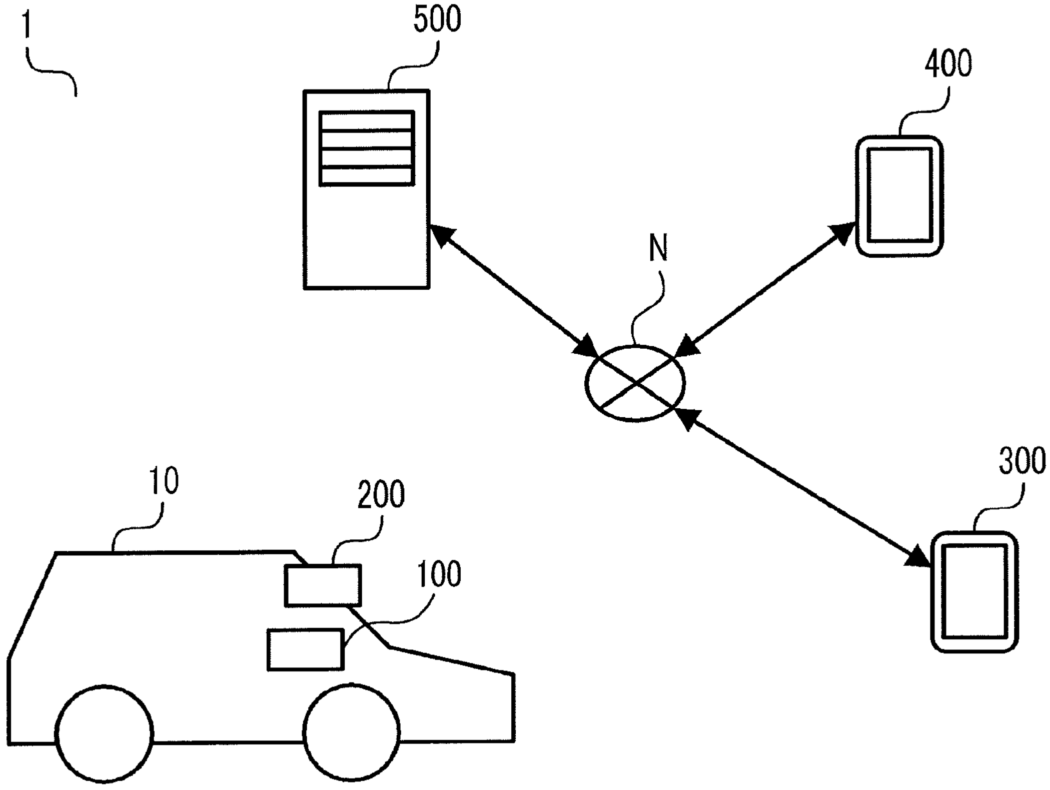
FIG. 1 shows a schematic configuration example of a valet parking system of a vehicle according to an embodiment 1.

A configuration of a valet parking system (notification system) of a vehicle according to the embodiment 1 will be described. FIG. 1 shows a schematic configuration example of a valet parking system 1 of the vehicle according to the embodiment 1. The valet parking system 1 of the vehicle is a system to realize the valet parking service of the vehicle described above. The valet parking system 1 of the vehicle has a locking and unlocking device 100, a key unit 200, a requester terminal 300 (notification device), a substitute agent terminal 400, and a server 500. The requester terminal 300, the substitute agent terminal 400, and the server 500 are connected to each other in a communicable manner through a network N. Each of the locking and unlocking device 100 and the key unit 200 is an on-vehicle device provided in a vehicle 10. Each of the requester terminal 300 and the substitute agent terminal 400 is the portable terminal such as the mobile phone, the smartphone, the tablet terminal, and the notebook type personal computer. The server 500 may be configured to have one server or a plurality of servers.

The network N is a public communication network such as the Internet. The network N may be another communication network such as a wide area network (WAN). The network N may include wireless communication networks such as a cellular phone communication network such as the mobile phone and WiFi.

The requester who requests the valet parking of the vehicle can perform the request for the valet parking of the vehicle, a checking of a parking completion report, and the like using the requester terminal 300. The request for the valet parking of the vehicle, the checking of the parking completion report, and the like may be performed using a general application (mail software or browser software) or a dedicated application.

The substitute agent who performs the valet parking of the vehicle can receive a valet parking request of the vehicle and report parking completion using the substitute agent terminal 400. The reception of the valet parking request of the vehicle, the report of the parking completion, and the like may be performed using a general application (mail software or browser software) or a dedicated application. When the valet parking request of the vehicle is received, the substitute agent terminal 400 acquires authentication information for locking and unlocking the doors of the vehicle from the server 500.

The server 500 manages the valet parking request of the vehicle, the parking completion report, the authentication information, and the like. In the embodiment 1, the valet parking request of the vehicle 10 is sent from the requester terminal 300 to the substitute agent terminal 400 through the server 500, and the parking completion report of the vehicle 10 is sent from the substitute agent terminal 400 to the requester terminal 300 through the server 500.

The locking and unlocking device 100 performs the locking and the unlocking of the doors of the vehicle 10. For example, the locking and unlocking device 100 can communicate with the smart key or the key unit 200. The locking and unlocking device 100 acquires a key ID output from the smart key or the key unit 200 and permits the locking and the unlocking of the doors of the vehicle 10 when the acquired key ID matches a key ID stored in advance in the locking and unlocking device 100. When the locking and the unlocking of the doors are permitted, the locking and unlocking device 100 performs the locking and the unlocking of the doors of the vehicle 10 in response to a user operation on the smart key, the portable terminal, a switch provided in the door of the vehicle 10, and the like. It is possible to start the engine of the vehicle 10 by the same process as the process for locking and unlocking the doors of the vehicle 10.

The key unit 200 has the same configuration as the configuration of the smart key of the vehicle 10. The key unit 200 can communicate with the portable terminal (requester terminal 300 or substitute agent terminal 400) in addition to the communication with the locking and unlocking device 100. The key unit 200 acquires the authentication information output from the portable terminal and performs authentication using the acquired authentication information. When the authentication succeeds, the key unit 200 outputs the key ID of the vehicle 10 stored in advance in the key unit 200. As a result, determination is made that the key ID acquired from the key unit 200 by the locking and unlocking device 100 matches the key ID stored in advance in the locking and unlocking device 100, and the locking and the unlocking of the doors of the vehicle 10 are permitted. Therefore, even a person who does not hold the smart key can lock and unlock the doors of the vehicle 10 using the portable terminal instead of the smart key.

A method of performing the locking and the unlocking of the doors of the vehicle 10 using the portable terminal instead of the smart key is not limited to the above method. For example, the portable terminal may acquire and output the key ID, and the locking and unlocking device 100 may acquire the key ID output from the portable terminal and use the acquired key ID for the process.

Device Configuration

Figure 2:
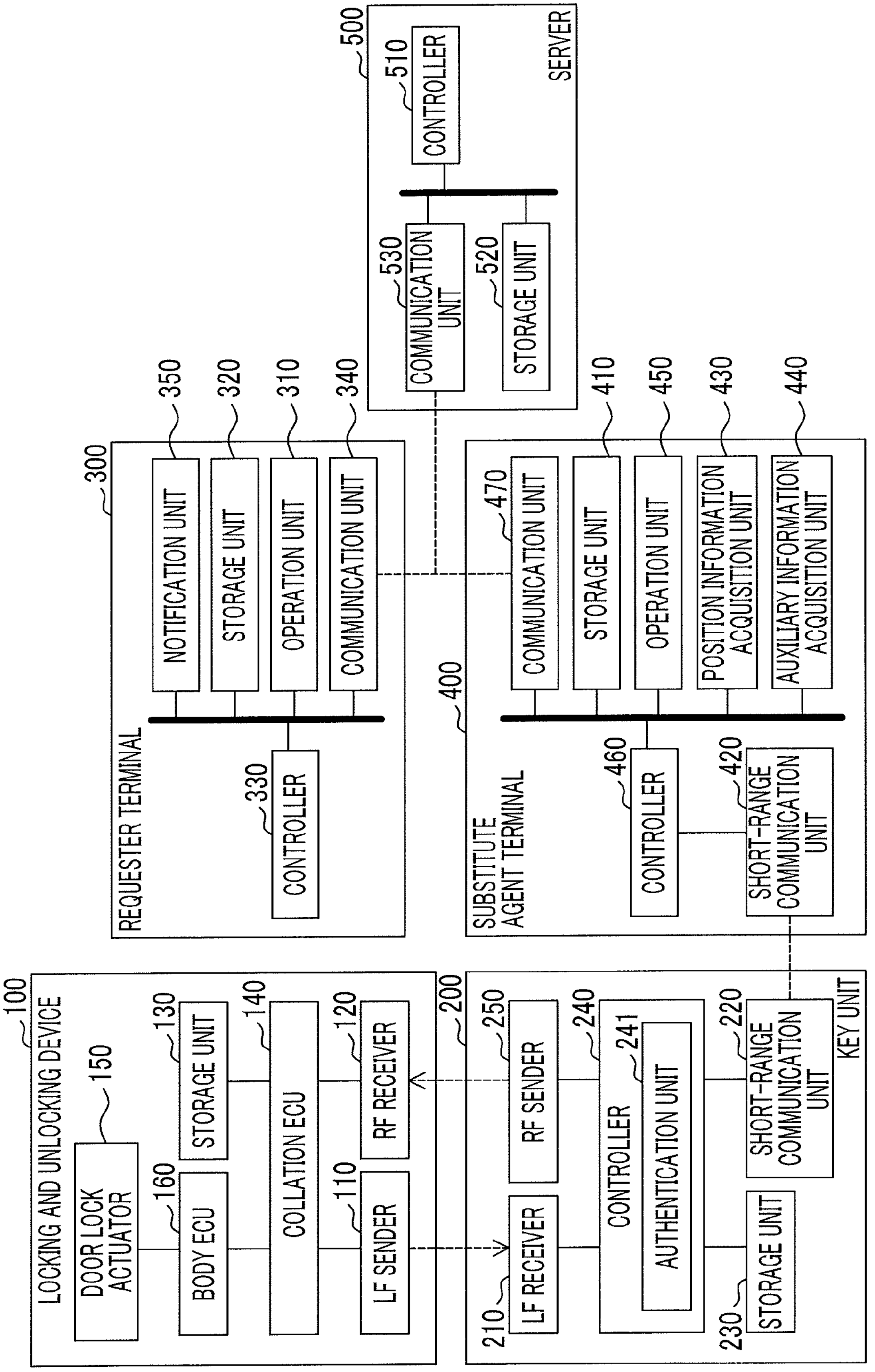
FIG. 2 shows a schematic configuration example of each device of the valet parking system of the vehicle according to the embodiment 1.

A configuration of each device of the valet parking system 1 of the vehicle will be schematically described. FIG. 2 shows a schematic configuration example of each device of the valet parking system 1 of the vehicle. In FIG. 2, the network N in FIG. 1 is omitted. As shown in FIG. 2, the locking and unlocking device 100 has an LF sender 110, an RF receiver 120, a storage unit 130, a collation electronic control unit (ECU) 140, a door lock actuator 150, and a body ECU 160. The key unit 200 has an LF receiver 210, a short-range communication unit 220, a storage unit 230, a controller 240, and an RF sender 250. The requester terminal 300 has an operation unit 310, a storage unit 320, a controller 330, a communication unit 340, and a notification unit 350. The substitute agent terminal 400 has a storage unit 410, a short-range communication unit 420, a position information acquisition unit 430, an auxiliary information acquisition unit 440, an operation unit 450, a controller 460, and a communication unit 470. The server 500 has a controller 510, a storage unit 520, and a communication unit 530.

Configuration of Locking And Unlocking Device 100

A configuration of the locking and unlocking device 100 will be described in detail.

The LF sender 110 sends a radio wave of a low frequency (LF) band for detecting (polling) the key unit 200 or the smart key. The LF band is, for example, a frequency band of 100 kHz or more and 300 kHz or less.

The RF receiver 120 receives a radio wave of a high frequency (RF) band sent from the key unit 200 or the smart key. The RF band is, for example, a frequency band of 100 MHz or more and 1 GHz or less. For example, the RF receiver 120 receives a radio wave indicating the key ID, locking and unlocking information for instructing the locking or the unlocking of the doors of the vehicle 10.

The storage unit 130 stores various pieces of information (data) such as the key ID of the vehicle 10, a program executed by the collation ECU 140, and a program executed by the body ECU 160. For example, the storage unit 130 is a semiconductor memory, a magnetic disk, an optical disk, or the like.

The collation ECU 140 analyzes the radio wave received by the RF receiver 120. For example, the collation ECU 140 determines whether the key ID acquired by the RF receiver 120 matches the key ID of the vehicle 10 stored in advance in the storage unit 130. When the determination is made that the key ID acquired by the RF receiver 120 matches the key ID of the vehicle 10 stored in advance in the storage unit 130, the collation ECU 140 permits the locking and the unlocking of the doors of the vehicle 10. When the locking and the unlocking of the doors are permitted, the collation ECU 140 outputs locking and unlocking control signals for controlling the locking and the unlocking of the doors of the vehicle 10 according to the locking and unlocking information acquired by the RF receiver 120.

The door lock actuator 150 is an actuator (motor or the like) configured to perform the locking and the unlocking of the doors of the vehicle 10.

The body ECU 160 performs the overall control of the vehicle 10. For example, the body ECU 160 drives the door lock actuator 150 such that the locking or the unlocking of the doors of the vehicle 10 is performed according to the locking and unlocking control signals output from the collation ECU 140. The locking and unlocking control signals, a drive signal for driving the door lock actuator 150, and the like are sent through an in-vehicle network such as a controller area network (CAN). The collation ECU 140 and the body ECU 160 may be integrally configured.

Configuration of Key Unit 200

A configuration of the key unit 200 will be described in detail.

The LF receiver 210 receives a polling signal (radio wave of RF band) output from the locking and unlocking device 100 (LF sender 110).

The short-range communication unit 220 communicates with the portable terminal (requester terminal 300 or substitute agent terminal 400) and acquires the authentication information from the portable terminal. For example, the short-range communication unit 220 performs short-range communication in accordance with a predetermined wireless communication standard. Specifically, the short-range communication unit 220 performs the communication in accordance with the standard such as Bluetooth (registered trademark) Low Energy (BLE), near field communication (NFC), ultra wide band (UWB), or WiFi (registered trademark).

The storage unit 230 stores various pieces of information (data) such as reference information referred to by the authentication using the authentication information, the key ID of the vehicle 10, and a program executed by the controller 240. For example, the storage unit 230 is the semiconductor memory, the magnetic disk, the optical disk, or the like.

The controller 240 is a processor (central processing unit (CPU) or digital signal processor (DSP)) configured to perform the overall control of the key unit 200. The controller 240 has an authentication unit 241. The authentication unit 241 performs the authentication using the authentication information acquired by the short-range communication unit 220. When the authentication by the authentication unit 241 succeeds, the controller 240 instructs the RF sender 250 to output the key ID or the locking and unlocking information. The controller 240 may read and execute the program stored in advance in the storage unit 230 to realize various functions including the authentication unit 241 or may not read and execute the program. The various functions including the authentication unit 241 may be realized by hardware.

The authentication unit 241 determines that the authentication succeeds when the authentication information acquired by the short-range communication unit 220 satisfies a predetermined condition and determines that the authentication fails when the authentication information does not satisfy the predetermined condition. The predetermined condition is, for example, any of the following conditions 1 to 3. Condition 1: The authentication information matches the reference information. Condition 2: A result of performing a predetermined process (encryption process, decryption process, or the like) on one piece of the authentication information and the reference information matches the other piece of the authentication information and the reference information. Condition 3: A result of performing the predetermined process (encryption process, decryption process, or the like) on the authentication information matches a result of performing the process on the reference information.

The RF sender 250 sends a radio wave (radio wave of the RF band) indicating the key ID or the locking and unlocking information in response to the instruction from the controller 240. Specifically, the RF sender 250 sends the radio wave indicating the key ID of the vehicle 10 stored in advance in the storage unit 230, sends the radio wave indicating the locking and unlocking information generated by the controller 240, or sends the radio wave indicating both the key ID and the locking and unlocking information. An acquisition method of the key ID or the locking and unlocking information is not particularly limited. For example, an encryption key ID (encrypted key ID) may be stored in advance in the storage unit 230, and the controller 240 may perform the decryption process using the authentication information on the encryption key ID to generate a key ID (not encrypted key ID; decryption key ID). The short-range communication unit 220 may acquire the locking and unlocking information output from the portable terminal.

Configuration of Requester Terminal 300

A configuration of the requester terminal 300 will be described in detail.

The operation unit 310 accepts a user operation on the requester terminal 300. For example, the operation unit 310 accepts a request operation and the like for the valet parking request of the vehicle.

The storage unit 320 stores various pieces of information (data) such as the parking completion report acquired by the requester terminal 300 and a program executed by the controller 330. For example, the storage unit 320 is the semiconductor memory, the magnetic disk, the optical disk, or the like.

The controller 330 is a processor (CPU or DSP) configured to perform the overall control of the requester terminal 300. The controller 330 instructs the communication unit 340 to output request information for the valet parking request of the vehicle in response to the request operation. The request information includes requester information (ID, name, age, gender, or the like) for specifying the requester, vehicle information (ID, vehicle type, color, plate number, or the like) for specifying the vehicle 10, and the like. The request information may not include the requester information. The requester information may be input to the requester terminal 300 by the request operation or may be stored in advance in the storage unit 320. The requester information may be registered in advance in the server 500. The same applies to the vehicle information.

The communication unit 340 communicates with the server 500. For example, the communication unit 340 outputs the request information to the server 500 in response to the instruction from the controller 330. The request information is output from the server 500 to the substitute agent terminal 400. Therefore, the substitute agent is demanded to perform the valet parking of the vehicle 10 based on a demand from the requester by the process of the communication unit 340. The communication unit 340 acquires the parking completion report from the server 500. The controller 330 stores (records) the parking completion report acquired by the communication unit 340 in the storage unit 320.

The notification unit 350 notifies the requester of the parking completion report acquired by the communication unit 340. For example, the notification unit 350 has a speaker or a display unit and notifies the requester of the parking completion report by a voice output or an image display.

Configuration of Substitute Agent Terminal 400

A configuration of the substitute agent terminal 400 will be described.

The storage unit 410 stores various pieces of information (data) such as information (request information or authentication information) acquired by the communication unit 470, a program executed by the controller 460, and the like.

The short-range communication unit 420 communicates with the key unit 200 (short-range communication unit 220). For example, the short-range communication unit 420 performs the short-range communication in accordance with the predetermined wireless communication standard (standard such as BLE, NFC, UWB, and WiFi (registered trademark)). In the embodiment 1, after the acquisition of the request information by the substitute agent terminal 400 is checked, the substitute agent heads toward the vehicle 10. After the substitute agent arrives at a position of the vehicle 10, the short-range communication unit 420 outputs the authentication information acquired by the substitute agent terminal 400 to the key unit 200. Consequently, it is possible to achieve the valet parking accompanying the locking and unlocking of the vehicle 10.

After the parking of the vehicle 10 is completed, the position information acquisition unit 430 acquires the position information relating to the parking position of the vehicle 10 (hereinafter, simply referred to as "position information"). In the embodiment 1, the position information acquisition unit 430 is a receiver of a satellite positioning system such as a global positioning system (GPS) and acquires information (information such as latitude and longitude) obtained by the satellite positioning system as the position information. The position information may include information other than the information obtained by the satellite positioning system.

After the parking of the vehicle 10 is completed, the auxiliary information acquisition unit 440 acquires the auxiliary information to help the requester to find the vehicle 10. In the embodiment 1, the auxiliary information acquisition unit 440 has a microphone, an imaging unit, a character input unit, and the like. The auxiliary information acquisition unit 440 acquires information including at least any of a voice relating to the parking position of the vehicle, a photograph relating to the parking position of the vehicle, or a text relating to the parking position of the vehicle as the auxiliary information. For example, the auxiliary information acquisition unit 440 acquires information such as a voice or a text such as "parked at No. * of * parking lot" or photographs of the vehicle 10 and surroundings thereof as the auxiliary information. The auxiliary information may include information other than the voice, the photograph, and the text.

The operation unit 450 accepts a user operation on the substitute agent terminal 400. For example, the operation unit 450 accepts the completion operation for notifying the substitute agent terminal 400 of the completion of the valet parking of the vehicle or the like.

The controller 460 is a processor (CPU or DSP) configured to perform the overall control of the substitute agent terminal 400. The controller 460 instructs the communication unit 470 to output the parking completion report in response to a completion operation. In the embodiment 1, the parking completion report includes position information acquired by the position information acquisition unit 430 and auxiliary information acquired by the auxiliary information acquisition unit 440. After the substitute agent locks the doors of the vehicle 10 from the outside of the vehicle 10 and performs the completion operation, the controller 460 deletes the authentication information from the storage unit 410. Therefore, it is possible to suppress getting in or driving of the vehicle 10 by the substitute agent after the parking is completed.

The controller 460 may instruct the position information acquisition unit 430 to acquire the position information in response to the completion operation. The position information acquisition unit 430 may acquire the position information in response to the instruction from the controller 460. The controller 460 may urge the substitute agent to perform the user operation (voice input, imaging operation, text input, or the like) for acquiring the auxiliary information in response to the completion operation.

Invalidation of the authentication information is not limited to the deletion of the authentication information. For example, the authentication information may be invalidated by rewriting of the authentication information. The number of usable times and a usable period of the same authentication information may be limited. Whether the number of use times exceeds the number of usable times, whether a current time point is within the usable period, or the like can be determined by the key unit 200 or the substitute agent terminal 400.

The communication unit 470 communicates with the server 500. For example, the communication unit 470 acquires the request information or the authentication information from the server 500. The communication unit 470 outputs the parking completion report (position information and auxiliary information) to the server 500 in response to the instruction from the controller 460.

Configuration of Server 500

A configuration of the server 500 will be described. The controller 510 is a processor (CPU or DSP) configured to perform the overall control of the server 500. The storage unit 520 stores various pieces of information (data). For example, the storage unit 520 is the semiconductor memory, the magnetic disk, the optical disk, or the like. The storage unit 520 stores in advance the authentication information for each vehicle. The communication unit 530 communicates with the requester terminal 300 or the substitute agent terminal 400 (communication unit 340 or the communication unit 470).

For example, the communication unit 530 acquires the request information from the requester terminal 300. When the communication unit 530 acquires the request information from the requester terminal 300, the controller 510 instructs the communication unit 530 to output the request information and the authentication information of the vehicle 10 stored in the storage unit 520. The communication unit 530 outputs the request information acquired from the requester terminal 300 and the authentication information of the vehicle 10 to the substitute agent terminal 400 in response to the instruction from the controller 510.

The communication unit 530 acquires the parking completion report from the substitute agent terminal 400. When the communication unit 530 acquires the parking completion report from the substitute agent terminal 400, the controller 510 instructs the communication unit 530 to output the parking completion report. The communication unit 530 outputs the parking completion report acquired from the substitute agent terminal 400 to the requester terminal 300 in response to the instruction from the controller 510.

Process Flow of Valet Parking System 1 of Vehicle

Figure 3:
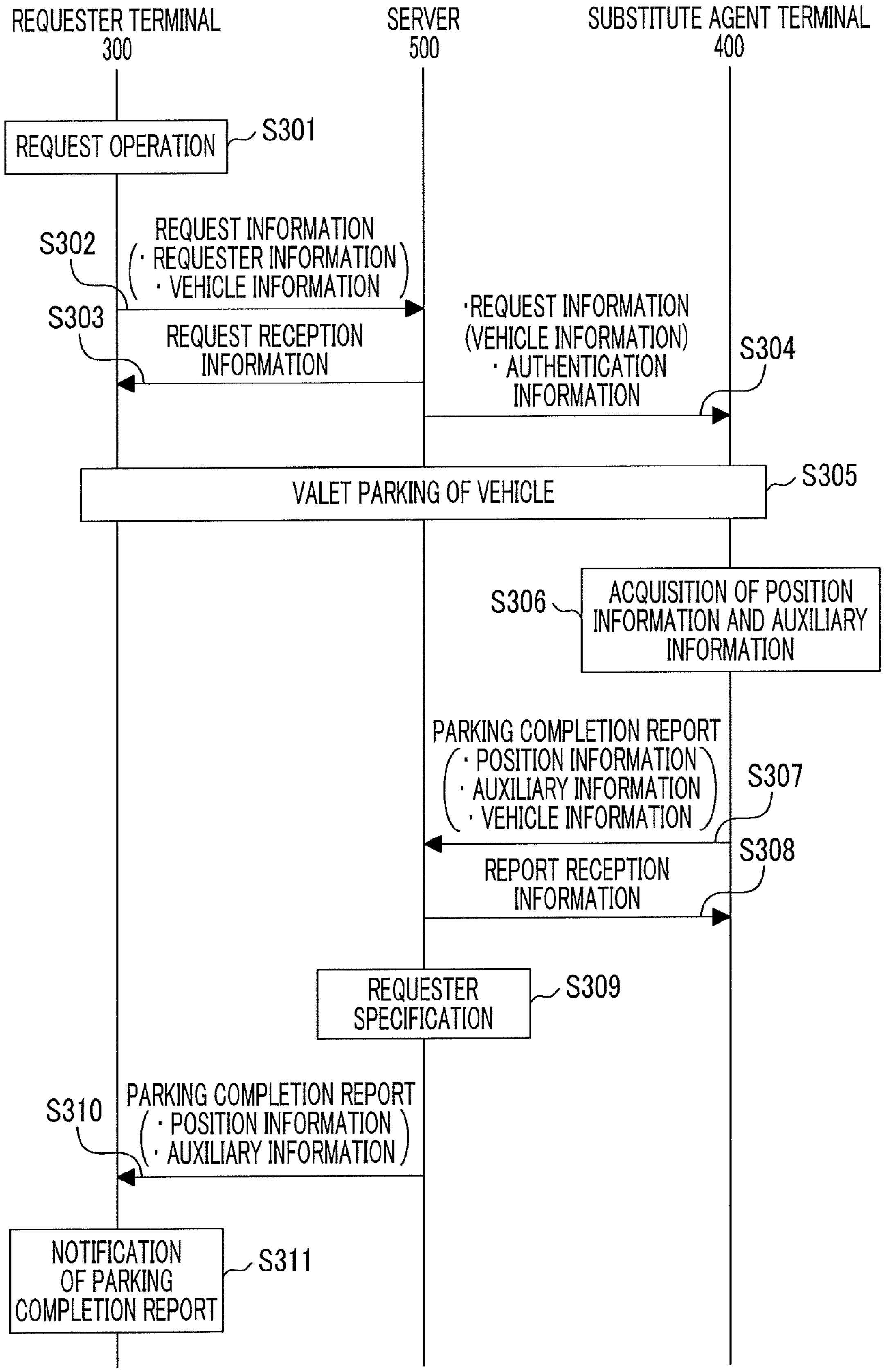
FIG. 3 shows a process flow example of the valet parking system of the vehicle according to the embodiment 1.

A process flow of the valet parking system 1 of the vehicle will be described. FIG. 3 is a sequence diagram showing a process flow example of the valet parking system 1 of the vehicle.

First, the requester performs the request operation on the operation unit 310 of the requester terminal 300 (step S301). Next, the communication unit 340 of the requester terminal 300 outputs the request information (requester information, vehicle information, or the like) to the communication unit 530 of the server 500 in response to the request operation (step S302). The communication unit 530 returns request reception information to the communication unit 340 in response to the acquisition of the request information (step S303). The request reception information indicates, for example, that the request information is acquired, the valet parking request of the vehicle is received, and the like. Therefore, the requester can grasp that the valet parking request of the vehicle is successfully performed by checking the request reception information.

Next, the communication unit 530 of the server 500 outputs the request information and the authentication information of the vehicle 10 to the communication unit 470 of the substitute agent terminal 400 in response to the acquisition of the request information (step S304). The request information that is output from the server 500 to the substitute agent terminal 400 may or may not be the same as the request information that is output from the requester terminal 300 to the server 500. For example, the request information that is output from the requester terminal 300 to the server 500 includes the requester information and the vehicle information. The request information that is output from the server 500 to the substitute agent terminal 400 may not include at least one of the requester information and the vehicle information. However, when the request information that is output from the server 500 to the substitute agent terminal 400 includes the vehicle information, the substitute agent can easily find the vehicle 10 since the vehicle information can be checked. Information indicating solely the position of the vehicle 10 may be output from the server 500 to the substitute agent terminal 400 as the request information.

The substitute agent receives the vehicle 10 from the requester and moves and parks the vehicle 10 based on the request information acquired by the substitute agent terminal 400 (step S305: valet parking of vehicle). After the parking is completed, the position information acquisition unit 430 acquires the position information, and the auxiliary information acquisition unit 440 acquires the auxiliary information (step S306). The substitute agent locks the doors of the vehicle 10 from the outside of the vehicle 10 using the authentication information. The substitute agent may have a spare key or the like of the vehicle 10 and perform the locking and the unlocking of the doors or the like of the vehicle 10 using the spare key.

Next, the communication unit 470 of the substitute agent terminal 400 outputs the parking completion report (position information, auxiliary information, vehicle information, and the like) to the communication unit 530 of the server 500 in response to the completion operation to the operation unit 450 of the substitute agent terminal 400 (step S307). Here, since the locking of the doors of the vehicle 10 is completed, the controller 460 of the substitute agent terminal 400 deletes the authentication information from the storage unit 410 of the substitute agent terminal 400. Next, the communication unit 530 returns report reception information to the communication unit 470 in response to the acquisition of the parking completion report (step S308). The report reception information indicates, for example, that the parking completion report is acquired. Therefore, the substitute agent can grasp that the parking completion report is successfully performed by checking the report reception information.

The controller 510 of the server 500 specifies a corresponding requester (requester information) based on the parking completion report (vehicle information) acquired by the communication unit 530 of the server 500 (step S309). Next, the communication unit 530 of the server 500 outputs the parking completion report to the communication unit 340 of the requester terminal 300 based on a specification result of the requester (step S310). The parking completion report that is output from the server 500 to the requester terminal 300 may or may not be the same as the parking completion report that is output from the substitute agent terminal 400 to the server 500. The parking completion report that is output from the server 500 to the requester terminal 300 may include the position information and the auxiliary information.

Next, the notification unit 350 of the requester terminal 300 notifies the requester of the parking completion report (position information and auxiliary information) acquired by the communication unit 340 of the requester terminal 300 (step S311). Since the auxiliary information is also notified in addition to the position information, the requester can easily find the vehicle 10 as compared with when the vehicle 10 is searched from solely the position information. For example, the requester can approach the vehicle 10 to some extent based on the position information obtained by the satellite positioning system and can easily find the vehicle 10 based on the auxiliary information such as the voice, the photograph, or a comment.

Summary

According to the embodiment 1, as described above, another piece of information (auxiliary information) to help the requester to find a vehicle is notified in addition to the position information relating to the parking position of the vehicle. With the notification described above, the requester can easily find the vehicle as compared with when the target vehicle is searched from solely the position information.

The notification unit 350 of the requester terminal 300 may perform guidance to the parking position of the vehicle based on the position information. Consequently, the requester can easily approach the target vehicle to some extent by simply moving according to the guidance.

Embodiment 2

Hereinafter, an embodiment 2 of the disclosure will be described with reference to drawings. In the following description, points (configurations or processes) different from the embodiment 1 will be described in detail, and the description of the same points as the embodiment 1 will be omitted.

In the embodiment 1, the example of using the information relating to the voice, the photograph, the text, or the like relating to the parking position of the vehicle as the auxiliary information is described. However, when similar scenery continues in a wide area around the parking position of the vehicle, the requester may not be able to grasp the parking position of the vehicle even when the requester views a photograph of the parking position of the vehicle. When the voice or the text is ambiguous, the requester may also not be able to grasp the parking position of the vehicle from the voice or the text. In the embodiment 1, since the user operation such as the voice input, the imaging operation, or the text input is requested in order to obtain the auxiliary information, a load of the substitute agent increases. In the embodiment 2, an example that can reduce the load of the substitute agent and allow the requester to find the target vehicle more reliably and easily will be described.

System Configuration and Device Configuration

Figure 4:
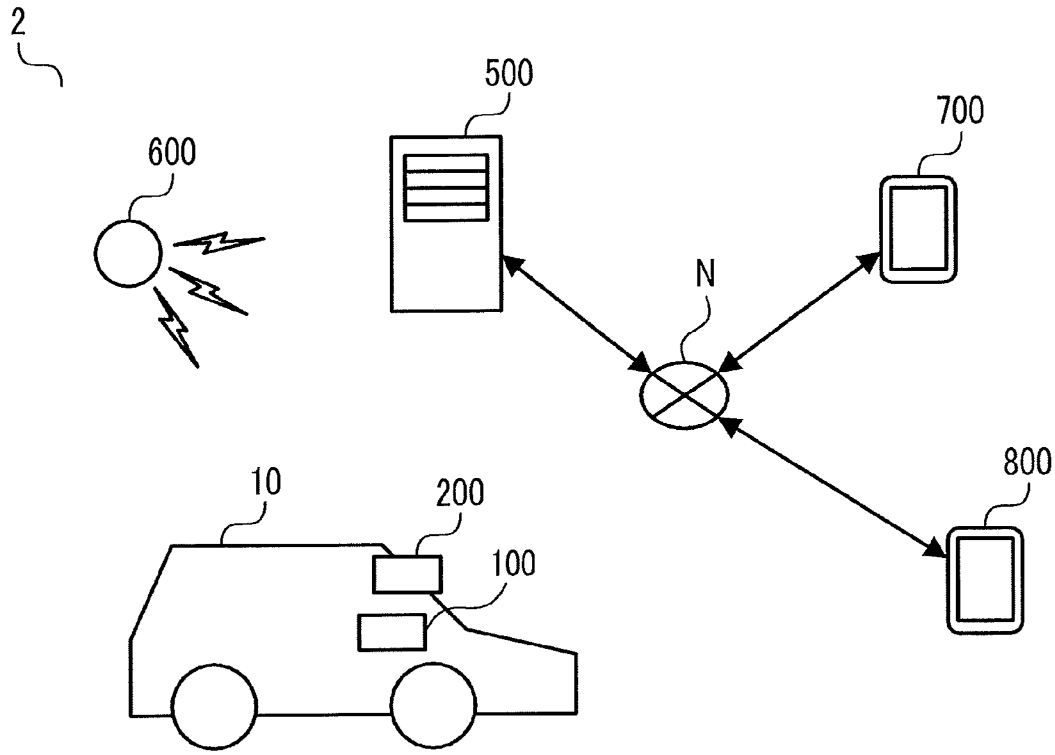
FIG. 4 shows a schematic configuration example of a valet parking system of a vehicle according to an embodiment 2.

A configuration of the valet parking system of the vehicle according to the embodiment 2 will be described. FIG. 4 shows a schematic configuration example of a valet parking system 2 of the vehicle according to the embodiment 2. In FIG. 4, the same reference numeral as in the embodiment 1 is assigned to the same device as the device in the embodiment 1. The valet parking system 2 of the vehicle has the locking and unlocking device 100, the key unit 200, the server 500, a beacon 600, a substitute agent terminal 700, and a requester terminal 800. The server 500, the substitute agent terminal 700, and the requester terminal 800 are connected to each other in a communicable manner through the network N. The substitute agent terminal 700 is the portable terminal such as the mobile phone, the smartphone, the tablet terminal, or the notebook type personal computer.

The beacon 600 is a transmitter installed near the parking position where the vehicle 10 is parked by the substitute agent and transmits (outputs) a predetermined beacon signal to a predetermined transmission area around the parking position of the vehicle. The beacon signal of the beacon 600 includes a beacon ID for specifying the beacon 600. The transmission area is, for example, an area of several tens of meters in radius with an installation position of the beacon 600 as the center. Specifically, the transmission area is an area of 30 meters or more and 100 meters or less in radius. A plurality of transmitters such as the beacon 600 is installed in a parking lot where the vehicle 10 may be parked by the substitute agent. The transmitter may be installed for each vehicle frame of the parking lot or the transmitters may be installed such that one transmitter is installed for a plurality of vehicle frames. Another transmitter having the same function as the beacon may be used instead of the beacon 600.

Figure 5:
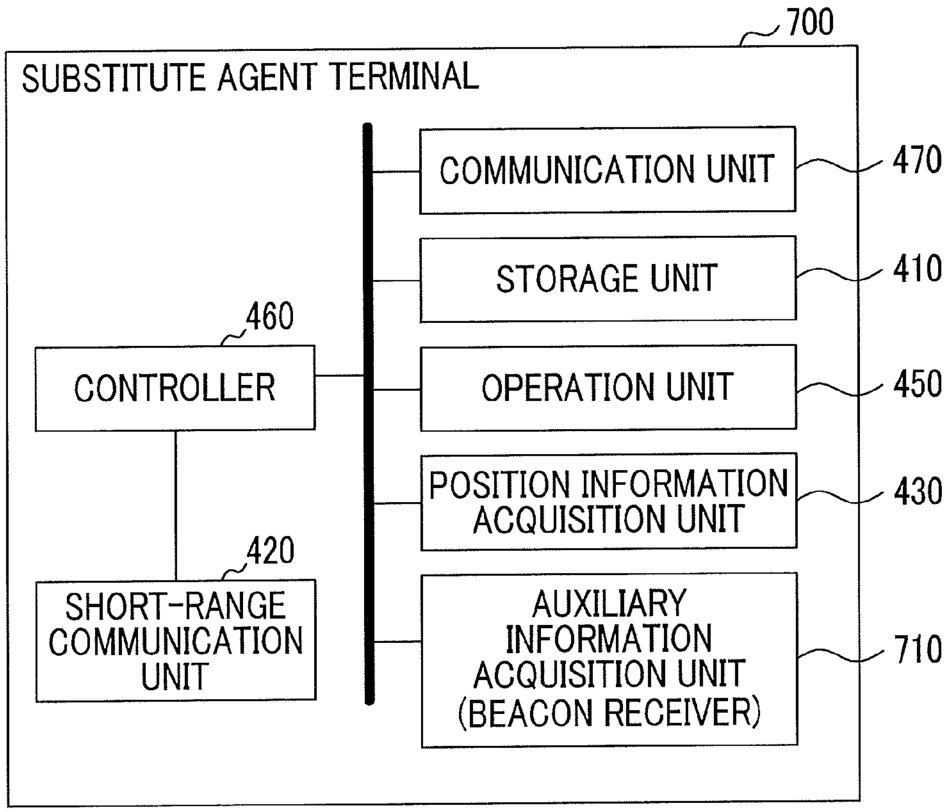
FIG. 5 shows a schematic configuration example of a substitute agent terminal according to the embodiment 2.

FIG. 5 shows a schematic configuration example of the substitute agent terminal 700. The substitute agent terminal 700 has the same function as the substitute agent terminal 400 in the embodiment 1. However, the substitute agent terminal 700 has an auxiliary information acquisition unit 710 instead of the auxiliary information acquisition unit 440 in the embodiment 1. The auxiliary information acquisition unit 710 is a beacon receiver configured to receive the beacon signal. After the parking of the vehicle 10 is completed, the vehicle 10 is within the transmission area of the beacon 600. Therefore, it is possible to receive (acquire) the beacon signal emitted from the beacon 600 in the vehicle 10 or around the vehicle 10. After the parking of the vehicle 10 is completed, the auxiliary information acquisition unit 710 receives the beacon ID emitted from the beacon 600 as the auxiliary information.

As the auxiliary information, another piece of information relating to the beacon 600 may be acquired. The auxiliary information relating to the beacon 600 may be acquired from a device different from the beacon 600. For example, the auxiliary information relating to the beacon 600 may be acquired from the server 500. A method of acquiring the beacon ID that is the auxiliary information is not particularly limited. For example, the beacon ID may be acquired in response to the completion operation or acquired in response to another user operation simpler than the voice input, the imaging operation, the text input, or the like. Therefore, it is possible to acquire the auxiliary information with the load (load of substitute agent) less than in the embodiment 1.

Figure 6:
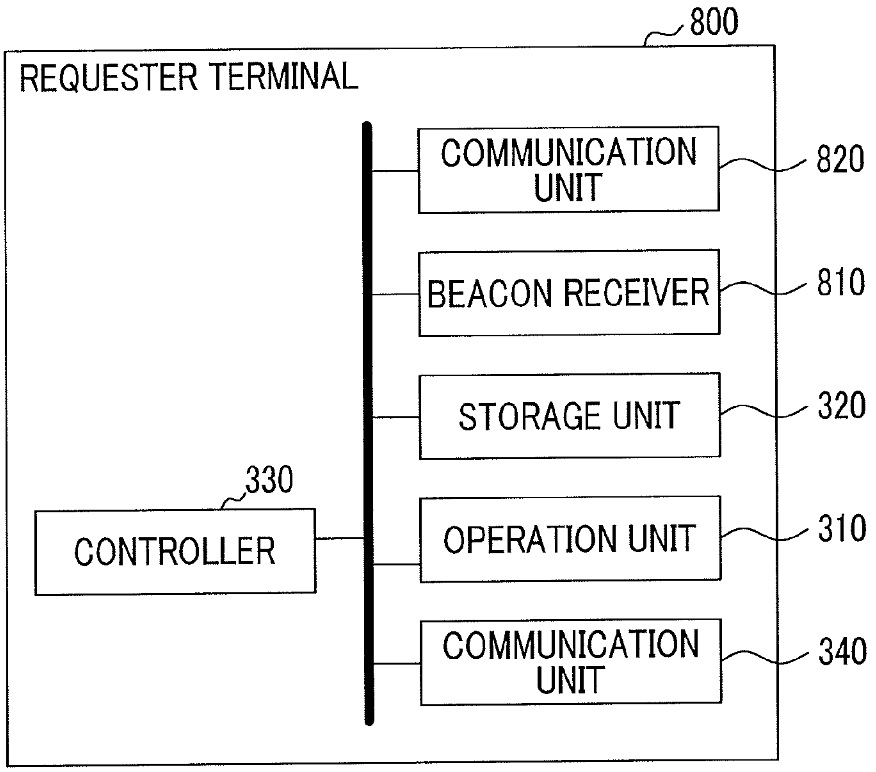
FIG. 6 shows a schematic configuration example of a requester terminal according to the embodiment 2.

FIG. 6 shows a schematic configuration example of the requester terminal 800. The requester terminal 800 has the same function as the requester terminal 300 in the embodiment 1. However, the requester terminal 800 further has a beacon receiver 810 and has a notification unit 820 instead of the notification unit 350 in the embodiment 1. The beacon receiver 810 receives the beacon signal. The notification unit 820 has the same function as the notification unit 350. However, when the requester (requester terminal 800) enters the transmission area of the beacon 600, the notification unit 820 performs the notification of the information based on the beacon signal of the beacon 600 as the notification of the auxiliary information. A detail of the notification of the auxiliary information or the like will be described below.

How to Find Vehicle 10

Figure 7:
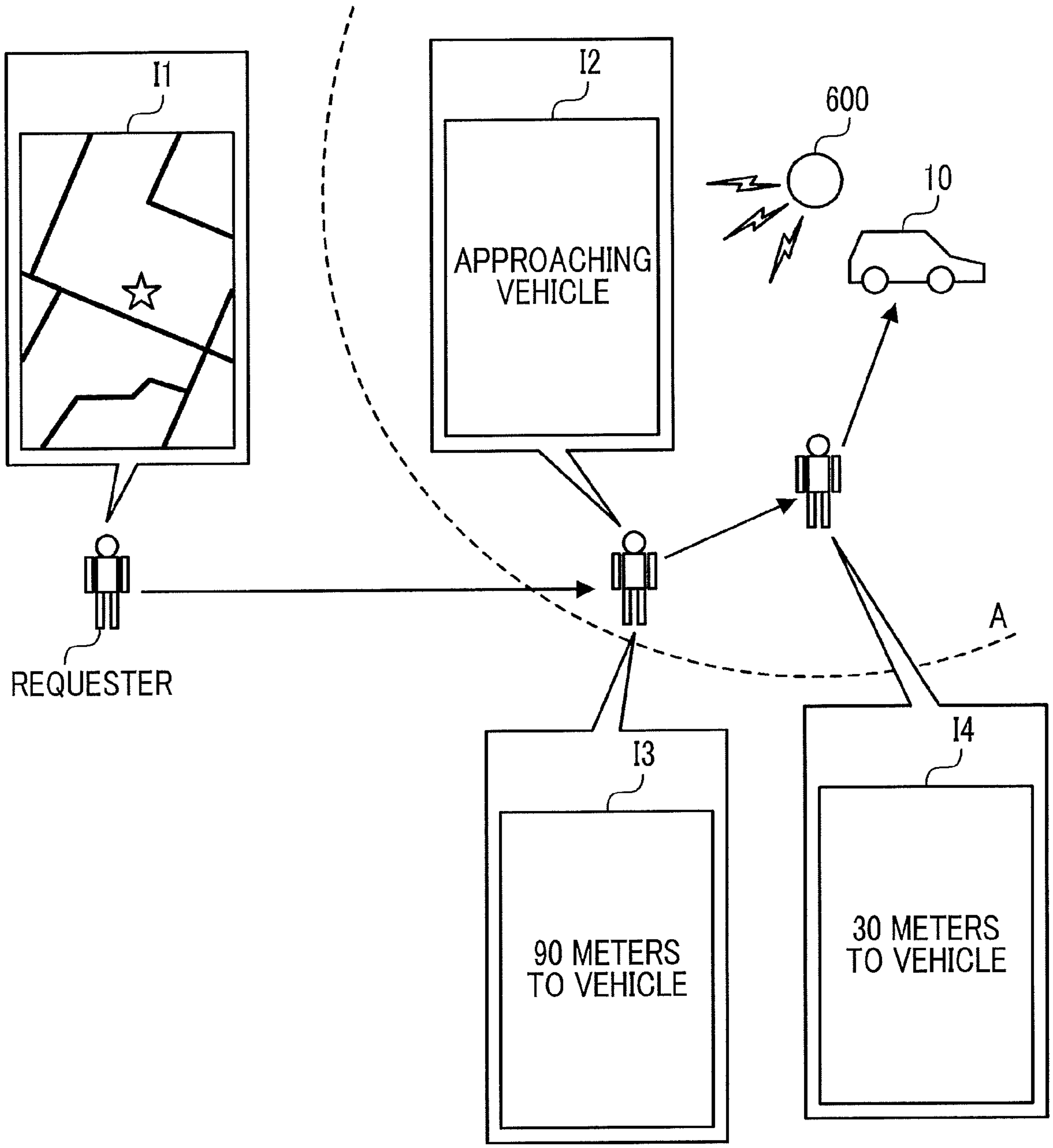
FIG. 7 shows an example of a state where a requester finds a target vehicle in the embodiment 2.

How to find the vehicle 10 will be described. FIG. 7 schematically shows an example of how the requester finds the vehicle 10.

First, the notification unit 820 notifies the requester of the position information. For example, the notification unit 820 (display unit) displays a map image I1 indicating a position (star in FIG. 7) obtained by the satellite positioning system. The requester can easily approach the vehicle 10 by checking the map image I1. The requester approaches the vehicle 10 to enter a transmission area A of the beacon 600.

When the requester (requester terminal 800) enters the transmission area A, the beacon receiver 810 receives the beacon signal emitted from the beacon 600. The controller 330 determines that the beacon signal of the beacon 600 is received from the beacon ID that is the auxiliary information and the beacon ID included in the received beacon signal, and instructs the notification unit 820 to notify the requester of the information based on the received beacon signal. The notification unit 820 notifies the requester of the information based on the received beacon signal in response to the instruction from the controller 330. For example, the notification unit 820 displays a graphic 12 (text or icon) indicating that the vehicle 10 is close. The requester can easily grasp that the vehicle 10 is close by checking the graphic 12 and thus can find the vehicle 10 more reliably and easily than in the embodiment 1.

Information based on the beacon signal is not limited to the above information. It is possible to obtain a distance to the beacon that emits the beacon signal by analyzing the beacon signal. Therefore, the information based on the beacon signal may be the information relating to a distance between the requester and the beacon 600. The distance between the requester and the beacon 600 corresponds to a distance between the requester and the vehicle 10. For example, the notification unit 820 may display graphics 13, 14 indicating the distance to the vehicle 10 (beacon 600). Therefore, the requester can easily grasp the distance to the vehicle 10, the approaching to the vehicle 10, or the like by checking the graphics 13, 14 and thus can find the vehicle 10 more easily.

Summary

According to the embodiment 2, as described above, the beacon ID of the beacon installed near the vehicle 10 is used as the auxiliary information, and the requester is notified of the information based on the beacon signal of the beacon when the requester enters the transmission area of the beacon. Therefore, the requester can find the target vehicle more reliably and easily than in the embodiment 1. The auxiliary information may further include information other than the beacon ID. For example, the auxiliary information may further include the information (information relating to voice, photograph, text, or the like) in the embodiment 1. Therefore, the requester can find the target vehicle more easily.

The configurations in the embodiments 1, 2, the processes, the service, and the like are merely examples. A change or modification of the embodiments 1, 2 as appropriate within a scope of the gist of the disclosure is included in the disclosure. A configuration obtained by combining the configurations in the embodiments 1, 2 as appropriate or the like is also included in the disclosure.

What is claimed is:

1. A notification system comprising:

a first terminal configured to be used by a first person and configured to:

notify the first person of position information relating to a parking position of a vehicle; and display auxiliary information, when the first person enters a predetermined area, the auxiliary information including an image of the vehicle and surroundings of the vehicle to help the first person to find the vehicle, wherein the vehicle is moved and parked by a second person before notifying the first person of the position information, and wherein the auxiliary information is captured by the second person using a second terminal, the auxiliary information and the position information are sent to the first terminal from the second terminal after the vehicle is parked by the second person.

2. The notification system according to claim 1, wherein the auxiliary information includes at least any of a voice relating to the parking position of the vehicle, a photograph relating to the parking position of the vehicle, or a text relating to the parking position of the vehicle.

3. The notification system according to claim 1, wherein the auxiliary information includes predetermined information relating to a transmitter configured to output a predetermined signal to the predetermined area around the parking position of the vehicle.

4. The notification system according to claim 3, wherein the information based on the predetermined signal is information relating to a distance between the first person and transmitter.

5. The notification system according to claim 3, wherein the transmitter transmits a beacon, and wherein the predetermined information is a beacon ID.

6. The notification system according to claim 1, wherein the first terminal performs guidance to the parking position of the vehicle based on the position information.

7. The notification system according to claim 1, further comprising:

a first receiver configured to acquire the position information after the vehicle is parked by the second person; and a second receiver configured to acquire the auxiliary information after the vehicle is parked by the second person.

8. The notification system according to claim 1, further comprising:

a server that is communicable with the first terminal and the second terminal, wherein the second terminal sends the position information and the auxiliary information to the first terminal through the server after the vehicle is parked by the second person.

9. A notification method comprising:

determining position information relating to a parking position of a vehicle;

notifying a first person of the position information relating to the parking position of the vehicle; and displaying on a first terminal when the first person enters a predetermined area, auxiliary information that includes an image of the vehicle and surroundings of the vehicle to help the first person to find the vehicle, wherein the vehicle is moved and parked by a second person before notifying the first person of the position information, and wherein the auxiliary information is captured by the second person using a second terminal, the auxiliary information and the position information are sent to the first terminal from the second terminal after the vehicle is parked by the second person.

10. The notification method according to claim 9, wherein the auxiliary information includes at least any of a voice relating to the parking position of the vehicle, a photograph relating to the parking position of the vehicle, or a text relating to the parking position of the vehicle.

11. The notification method according to claim 9, wherein the auxiliary information includes predetermined information relating to a transmitter configured to output a predetermined signal to the predetermined area around the parking position of the vehicle.

12. The notification method according to claim 11, wherein the information based on the predetermined signal is information relating to a distance between the first person and transmitter.

13. The notification method according to claim 11, wherein the transmitter transmits a beacon, and wherein the predetermined information is a beacon ID.

14. The notification method according to claim 9, wherein the first terminal performs guidance to the parking position of the vehicle based on the position information.

15. The notification method according to claim 9, further comprising:

acquiring the position information with a first receiver after the vehicle is parked by the second person; and acquiring the auxiliary information with a second receiver after the vehicle is parked by the second person.

16. The notification method according to claim 9, further comprising:

sending the position information and the auxiliary information to the first terminal from a second terminal configured to be used by the second person, after the vehicle is parked by the second person.

* * * * *